United States Patent [19]

Bonazza

[11] Patent Number: 5,110,682
[45] Date of Patent: May 5, 1992

[54] BONDING OF COMPOSITES

[75] Inventor: Benedict R. Bonazza, Bartlesville, Okla.

[73] Assignee: Phillips Petroleum Company, Bartlesville, Okla.

[21] Appl. No.: 570,188

[22] Filed: Aug. 20, 1990

[51] Int. Cl.$^5$ ............... B32B 27/06; C09J 5/02
[52] U.S. Cl. ................... 428/419; 106/311; 156/82; 156/153; 156/281; 156/308.6; 156/313; 252/364
[58] Field of Search ........ 156/308.6, 82, 281, 156/153, 313; 106/311; 252/364; 428/419

[56] References Cited

U.S. PATENT DOCUMENTS

| | | |
|---|---|---|
| 2,294,088 | 8/1942 | Kholos .................. 156/308.6 |
| 3,785,916 | 1/1974 | Turton et al. |
| 3,869,434 | 3/1975 | Campbell et al. |
| 4,075,388 | 2/1978 | Doss .................... 156/153 |
| 4,921,558 | 5/1990 | Johnson et al. ........... 428/419 |

OTHER PUBLICATIONS

Encyclopedia of Polymer Science and Engineering, vol. 15, 2nd Ed. 1989, pp. 380-402, "Solubility of Polymers".

Primary Examiner—John J. Gallagher
Attorney, Agent, or Firm—Richmond, Phillips, Hitchcock & Umphlett

[57] ABSTRACT

A method for the bonding of amorphous thermoplastic materials such as polyarylene sulfides, comprising suitably surface treating these materials, and using one or more or a combination of the following bonding agents: a suitable solvent such as N-methylpyrrolidone, a solution of the thermoplastic material in a suitable solvent; or a film of the thermoplastic material pretreated with a suitable solvent. Clamping of the treated surfaces followed by heating at a suitable pressure and temperature for a period of time sufficient to evaporate the bonding solvent, facilitates the bonding process.

28 Claims, No Drawings

BONDING OF COMPOSITES

BACKGROUND OF THE INVENTION

This invention relates to the bonding of composites.

Various techniques are known and used in the art for the bonding of composites. These techniques include but are not limited to fusion bonding, adhesive bonding, solvent bonding, mechanical fastening, and other suitable methods. It is also knwon in the art that the materials and/or methods useful for the bonding of one type of composite material are not necessarily suitable for the bonding of other types of composite materials. It is of common knowledge in the art that the method(s) of surface treatment used in preparing the composite material to be bonded influences the bond strength of the bonded composite material. Thus, there appears to be a consensus of opinion amongst those skilled in the art that the determination of bonding agents and/or techniques for various composite materials, is best achieved through actual experimentation.

It is known in the art that composite materials of thermoplastics can be bonded. But it is not known how best to bond all members of this class of materials. Because of the growing use of these materials for various applications, it is of interest to its commercial users to know or determine how best to bond these materials.

SUMMARY OF THE INVENTION

It is a general object of this invention to provide for a method of bonding amorphous thermoplastic composite materials.

It is a further object of this invention to provide for a method of solvent bonding amorphous polyarylene sulfide (PAS) materials.

In one embodiment of this invention, a method is provided for the solvent bonding of amorphous thermoplastic materials using an agent selected from the group consisting of N-alkylpyrrolidones, aromatic sulfones, cyclic alkyl sulfones, alkyl amides, lactams, and lactones.

In another embodiment of this invention, a method is provided for the solvent bonding of armorphous thermoplastic materials using a solution of the amorphous thermoplastic material dissolved in an agent selected from the group consisting of N-alkylpyrrolidones, aromatic sulfones, cyclic alkyl sulfones, alkyl amides, lactams, and lactones.

In a preferred embodiment of this invention, a method is provided for the solvent bonding of amorphous thermoplastic materials using strips of an amorphous thermoplastic film pre-treated with an agent selected from the group consisting of N-alkylpyrrolidones, aromatic sulfones, cyclic alkyl sulfones, alkyl amides, lactams, and lactones.

DETAILED DESCRIPTION OF THE INVENTION

In brief terms, the practice of this invention comprises the steps of optionally surface treating the suitable thermoplastic materials, followed by bonding these materials with one or more bonding agents selected from the group consisting of N-alkylpyrrolidones, aromatic sulfones, cyclic alkyl sulfones, alkyl amides, lactams, and lactones; a solution comprising the base resin of the thermoplastic material and at least one bonding agent selected from the group consisting of N-alkylpyrrolidones, aromatic sulfones, cyclic alkyl sulfones, alkyl amides, lactams, and lactones; or a film of the base resin of the thermoplastic material pretreated with at least one bonding agent selected from the group consisting of N-alkylpyrrolidones, aromatic sulfones, cyclic alkyl sulfones, alkyl amides, lactams, and lactones. The term bonding agent as used herein includes both the solid and/or liquid states of the materials used to accomplish bonding of amorphous thermoplastics. The bonded surfaces are then pressed together by means of a suitable device, and are heated at a suitable temperature for a period of time sufficient to evaporate the bonding solvent.

Generally speaking, all amorphous thermoplastics are useful in the practice of this invention. Preferred amongst the amorphous thermoplastics are the poly(arylene sulfides) sometimes designated herein as (PAS). These poly(arylene sulfides), can be made by employing suitable conventional methods known in the art. Examples of soluble poly(arylene sulfide) polymers in particular, and of poly(arylene sulfide) polymers in general, and methods of making these polymers are disclosed in U.S. Pat. Nos. 3,869,434 and 4,016,146, respectively, the disclosures of which are hereby incorporated by reference. Particularly preferred is poly(phenylene sulfide sulfone) (hereinafter referred to as PAS-2) sold under the registered trademark "RYTON ® S PPSS" by Phillips 66 Company.

Preparation of an amorphous polyarylene sulfide/carbon fiber composite prepreg tape in a manner useful for the practice of this invention can be accomplished by employing conventional techniques known in the art. One highly recommended technique is the pultrusion technique disclosed in U.S. Pat. No. 4,680,224, the disclosure of which is hereby incorporated by reference.

Preparation of laminates from the polyarylene sulfide/carbon fiber composite prepreg tape in a manner useful in the practice of this invention can also be accomplished by employing conventional techniques known in the art. Frequently, these laminates are multiply quasi-isotropic laminates made by a thermal press consolidation method.

Solvents that are suitable as bonding agents, and are useful in the practice of this invention include N-alkylpyrrolidones, aromatic sulfones, cyclic alkyl sulfones, alkyl amides, lactams, and lactones. Examples of these types of solvents include but are not limited to N-methylpyrrolidone, diphenyl sulfone, sulfolane, dimethylformamide, and dimethylacetamide. N-methylpyrrolidone is the most preferred member of this group.

Various surface treatments known in the art are useful in the practice of this invention. These methods include but are not limited to washing, sanding, grit blasting, flame treatment, and combinations of these methods.

In general, the actual practice of this invention involves the following procedures. First, the materials are obtained in suitable form (e.g. laminates). These materials are then cut into sample sizes that are suitable for the subsequent testing of bonding strengths. The surfaces of these samples are then optionally treated using suitable surface treatment techniques known in the art. Following surface treatment, these materials are then bonded using any of the bonding techniques or a combination thereof disclosed by this invention. These techniques are: 1) using a suitable bonding solvent such as N-methylpyrrolidone; 2) using a solution of the base resin of the thermoplastic material dissolved in a suitable solvent such as N-methylpyrrolidone; and/or 3) using suitable films of the base resin of the thermoplastic material pretreated with a suitable solvent such as N-methylpyrrolidone.

It is noted that when a solution of the thermoplastic material in a suitable solvent is to be used in the bonding technique, the concentration of the solvent will vary depending on the solubility of the particular thermoplastic material in the particular solvent used, and on other conditions such as temperature. It is preferred that a saturated solution of the thermoplastic material in the solvent be used. However, it is expressly noted that even minimal amounts of a suitable thermoplastic base resin in a suitable solvent would be effective for the practice of this invention. For N-methylpyrrolidone solvent and poly(phenylene sulfide sulfone) which are the ingredients of choice for the practice of this invention, it is reasonably expected that a general range of about 0.50 weight percent plastic in the solution to about 20 weight percent constitutes an effective range. The individualized determination of thermoplastic material/suitable solvent effective combination ranges can be readily and easily ascertained by those of ordinary skill in the art.

Regardless of the particular bonding technique used, during bonding, it is essential that to-be-bonded materials are held together by means of a suitable device during the bonding process. A suitable procedure is the use of a clamp to hold these materials together. The bonded materials are then heated at a suitable temperature for a period of time sufficient to evaporate the bonding solvent. This can be carried out at atmospheric pressure or preferably under reduced pressure to speed the evaporation process. Suitable temperature as used herein, means one that will cause the solvent to evaporate at the pressure being used and that is also below the melting point of the thermoplastic material used and below a temperature that would cause weaker bonds due to an excessively high rate of solvent evaporation that may result should "bubbling" or "boiling" occur. It is noted that the time required to evaporate the bonding solvent is inversely proportional to the temperature and directly proportional to the pressure selected. For practical considerations of time, an elevated temperature and reduced pressure are preferred. The selection of suitable pressures and temperatures for the various thermoplastic materials and solvents useful in the practice of this invention, can be easily accomplished by those of ordinary skill in the art. After evaporating off the bonding solvent, the bonded materials can then be tested for bonding strength by employing conventional tests known in the art.

In a preferred embodiment of this invention, a film form of amorphous poly(arylene sulfide sulfone) is useful. This material is preferably first surface treated using a wash method. This involves washing the surface of the material to remove any contaminants. It is desirable to use a hydrocarbon, chlorocarbon, or ketone type cleaning solvent, which is effective for removing oils and releasing agents, and which evaporates rapidly without leaving residues on the surface. Examples of such cleaning solvents include but are not limited to methyl ethyl ketone (MEK) and cyclohexane.

The surfaces to be bonded are then treated with a bonding agent, and are held together by means of a suitable clamping device during bonding. The bonded material is then heated at a suitable temperature and pressure for a period of time sufficient to evaporate the bonding agent.

The following illustrative example further details the various aspects of this invention.

EXAMPLE

This example allows a comparison of the bond strengths of bonds formed by various techniques between two pieces of PAS-2/carbon fiber composite laminate. The composite laminate was made by thermal press lamination and is a 16-ply quasi-isotropic layup of undirectional carbon fiber reinforced PAS-2 prepreg tape. The tape was made by pultrusion using techniques similar to those disclosed in U.S. Pat. No. 4,680,224. Specimens to be bonded were cut from the laminates in 1"×4"×0.182" size. Surfaces to be bonded were washed with methyl ethyl ketone and wiped dry. In some cases, additional surface preparations were employed. In one case, the washed surface was sanded using an orbital sander and 150-grit paper, washed with cyclohexane and dried. In another case, the washed surface was grit blasted using 100-grit silicon carbide, washed with cyclohexane and dried.

For the bonding involving NMP, the two surfaces to be bonded were simply brushed with NMP and pressed together. For the bonding involving NMP solution of PAS-2, the surfaces to be bonded were simply brushed with a 20 weight percent solution of PAS-2 in NMP and pressed together. For the bonding involving NMP and PAS-2 film, three sheets of 2-mil thick PAS-2 film had NMP applied to each side and were stacked between the two surfaces to be bonded. In all three bonding techniques, the pressed surfaces were held together under a pressure of about 25 psi provided by two 1¼ inch clips normally used for binding papers. In all cases, the two specimens to be bonded were overlapped ½-inch along the length (about 4 inch dimension) and were heated at 146° C. under a vacuum of 30 in. Hg for two hours to evaporate the solvent. Lap shear strengths were then determined using standard ASTM #D3163 testing procedures. Results of these tests at KSI=1000 psi are given in Table I.

TABLE I

| | Lap Shear Strengths (KSI) | | |
| | Bonding Method Used | | |
| Surface Treatment | NMP | Solution of 20 weight percent PAS-2 in NMP | PAS-2 Film + NMP |
| --- | --- | --- | --- |
| Wash Only | 3.19 | 3.88 | 4.43 |
| Sanded | 2.17 | 2.86 | 2.13 |
| Grit Blasted | 2.73 | 2.77 | 2.89 |

The data in Table I show that the best bond strength (4.43 KSI) was obtained in the case in which the surfaces to be bonded were only washed with methyl ethyl ketone and were bonded using three layers of 2-mil PAS-2 film treated on each side with NMP.

By way of comparison, similarly prepared specimens were tested which had been bonded using a commercial epoxy film adhesive (FM-300K from American Cyanamid) and various surface preparations. The best bond obtained involved either a grit blasting plus sanding or a grit blasting followed by a one-pass oxidizing flame treatment. In both cases, the lap shear strength was measured to be 3.24 KSI, which is considerably below that of the best two cases (3.88 and 4.43) from Table I.

While this invention has been described in detail for the purpose of illustration, it is not to be construed as That which is claimed is:

1. A method for the bonding of two amorphous thermoplastic articles comprising the steps of:
   (a) treating a surface of at least one of said articles with (i) at least one bonding agent selected from the group consisting of N-alkylpyrrolidones, aromatic sulfones, cyclic alkylsulfones, alkyl amides, lactams, and lactones, or (ii) with a solution of an amorphous thermoplastic of the type making up said article dissolved in at least one bonding agent selected from the group consisting of N-alkylpyrrolidones, aromatic sulfones, cyclic alkylsulfones, alkyl amides, lactams, and lactones to produce a treated surface;
   (b) contacting and pressing said treated surface with a surface of the other of said articles to produce contacted surfaces;
   (c) heating said contacted surfaces under conditions of temperature, pressure, and for a period of time sufficient to evaporate said bonding agent.

2. A method as in claim 1 wherein said treated surface is produced by treating with said at least one bonding agent.

3. A method as in claim 1 wherein said treated surface is produced by treating with said solution.

4. A method according to claim 1 wherein both surfaces to be contacted are treated with said bonding agent of (i).

5. A method in accordance with claim 1 wherein both surfaces to be contacted are treated with said solution of (ii).

6. A method as in claim 1 wherein said thermoplastic articles are in the form of a matrix reinforced with reinforcing fiber.

7. A method in accordance with claim 6 wherein said fibers are carbon fibers.

8. A method in accordanc with claim 7 wherein said matrix reinforced with reinforcing fibers is produced by pultrusion.

9. A method as in claim 1 wherein said bonding agent is N-methylpyrrolidone.

10. A method as in claim 1 wherein said thermoplastic is a poly(arylene sulfide).

11. A method as in claim 1 wherein said thermoplastic is poly(phenylene sulfide sulfone).

12. A product produced by the bonding method of claim 1.

13. A method for the solvent bonding of two amorphous thermoplastic articles comprising the steps of:
   (a) treating both surfaces of a film made of an amorphous thermoplastic of the type making up said article with (i) at least one bonding agent selected from the group consisting of N-alkylpyrrolidones, aromatic sulfones, cyclic alkylsulfones, alkyl amides, lactams and lactones or (ii) with a solution of an amorphous thermoplastic of the type making up said articles dissolved in at least one bonding agent selected from the group of N-alkylpyrrolidones, aromatic sulfones, cyclic alkylsulfones, alkyl amides, lactams and lactones, the thus-treated film being positioned between said articles;
   (b) contacting said articles with the thus-treated film to produce contacted surfaces; and
   (c) heating said contacted surfaces under conditions of temperature, pressure, and for a period of time sufficient to evaporate said bonding agent.

14. A method in accordance with claim 13 wherein said surfaces of said film are treated with said at least one bonding agent.

15. A method in accordance with claim 13 wherein said surfaces of said film are treated with said solution.

16. A method in accordance with claim 13 wherein said thermoplastic articles are in the form of a matrix reinforced with reinforcing fibers.

17. A method in accordance with claim 16 wherein said fibers are carbon fibers.

18. A method in accordance with claim 17 wherein said matrix reinforced with reinforcing fibers is formed by pultrusion.

19. A method in accordance with claim 13 wherein said bonding agent is N-methylpyrrolidone.

20. A method in accordance with claim 13 wherein said thermoplastic is a poly(arylene sulfide).

21. A method in accordance with claim 13 wherein said thermoplastic is poly(phenylene sulfide sulfone).

22. A product produced by the bonding method of claim 13.

23. A method for the solvent bonding of two poly(phenylene sulfide sulfone) articles comprising the steps of:
   (a) washing both surfaces of a poly(phenylene sulfide sulfone) film with methyl ethyl ketone solvent to produce washed surfaces;
   (b) treating said washed surfaces with N-methylpyrrolidone solvent to produce treated surfaces;
   (c) positioning the thus-treated film between said articles;
   (d) contacting and pressing said articles against said film to produce contacted surfaces; and
   (e) heating said contacted surfaces under conditions of temperature, pressure, and for a period of time sufficient to evaporate said N-methylpyrrolidone.

24. A method for the solvent bonding of poly(phenylene sulfide sulfone) articles comprising the steps:
   (a) washing a surface of each of the poly(phenylene sulfide sulfone) articles with methyl ethyl ketone solvent to produce washed surfaces;
   (b) treating said washed surfaces with N-methylpyrrolidone solvent to produce treated surfaces;
   (c) contacting and pressing said treated surfaces together with the aid of a clamping device to produce contacted surfaces of said articles; and
   (d) heating said contacted surfaces under conditions of temperature, pressure, and for a period of time sufficient to evaporate said N-methylpyrrolidone.

25. A method for the solvent bonding of poly(phenylene sulfide sulfone) comprising the steps of:
   (a) washing a surface of each of the poly(phenylene sulfide sulfone) articles with methyl ethyl ketone solvent to produce washed surfaces;
   (b) treating said washed surfaces with a solution of about 20 weight percent of poly(phenylene sulfide sulfone) dissolved in N-methylpyrrolidone to produce treated surfaces;
   (c) contacting and pressing the treated surfaces together, with the aid of a clamping device to produce contacted surfaces of said articles; and
   (d) heating said contacted surfaces at a suitable temperature and pressure for a period of time sufficient to evaporate said N-methylpyrrolidone.

26. A product produced by the bonding method of claim 23.

27. A product produced by the bonding method of claim 24.

28. A product produced by the bonding method of claim 25.